(12) United States Patent
Bray et al.

(10) Patent No.: US 12,008,805 B2
(45) Date of Patent: Jun. 11, 2024

(54) DETECTION OF MODULATING ELEMENTS (71) Applicant: BAE SYSTEMS plc, London (GB)

(72) Inventors: Mark Edgar Bray, Chelmsford (GB); Jason John Lepley, Chelmsford (GB)

(73) Assignee: BAE SYSTEMS plc, London (GB)

( * ) Notice: Subject to any disclaimer, the term of this patent is extended or adjusted under 35 U.S.C. 154(b) by 128 days.

(21) Appl. No.: 17/753,263

(22) PCT Filed: Aug. 13, 2020

(86) PCT No.: PCT/GB2020/051931
§ 371 (c)(1),
(2) Date: Feb. 25, 2022

(87) PCT Pub. No.: WO2021/038191
PCT Pub. Date: Feb. 4, 2021

(65) Prior Publication Data
US 2022/0299612 A1 Sep. 22, 2022

(30) Foreign Application Priority Data

Aug. 28, 2019 (GB) ...................................... 1912326
Oct. 28, 2019 (EP) ...................................... 19205694

(51) Int. Cl.
G01S 7/4865 (2020.01)
G06V 20/00 (2022.01)
G08B 13/196 (2006.01)

(52) U.S. Cl.
CPC ............ *G06V 20/00* (2022.01); *G01S 7/4865* (2013.01); *G08B 13/1965* (2013.01)

(58) Field of Classification Search
CPC ... G01H 9/00; G06T 7/70; G06T 2207/10016; G06V 10/255; G06V 10/431; G06V 20/52; G01S 7/4865; G08B 13/1965
See application file for complete search history.

(56) References Cited

U.S. PATENT DOCUMENTS

| | | | |
|---|---|---|---|
| 3,610,891 A | * | 10/1971 | Raciazek .............. B61L 25/041 235/494 |
| 5,264,916 A | | 11/1993 | Bushman |
| 5,341,435 A | | 8/1994 | Corbett et al. |
| 5,376,940 A | | 12/1994 | Abatzoglou |
| 5,999,652 A | | 12/1999 | Bushman |

(Continued)

FOREIGN PATENT DOCUMENTS

| | | |
|---|---|---|
| GB | 2213931 A | 8/1989 |
| GB | 2562829 A | 11/2018 |

(Continued)

OTHER PUBLICATIONS

International Preliminary Report on Patentability received for PCT/GB2020/051931, mail date: Mar. 10, 2022. 10 pages.

(Continued)

*Primary Examiner* — John A Tweel, Jr.
(74) *Attorney, Agent, or Firm* — Finch & Maloney PLLC (57) ABSTRACT Methods and apparatus for detecting a modulating element of an object are described in which signal values are obtained from one or more optical detectors. A determination is made if there is a time dependent variation in the obtained signal values at the one or more optical detector and a modulating element is detected based on the determination.

20 Claims, 8 Drawing Sheets

(56) References Cited

U.S. PATENT DOCUMENTS

| | | | |
|---|---|---|---|
| 7,193,720 B2* | 3/2007 | Gatt | G01H 9/00 356/489 |
| 7,551,519 B2* | 6/2009 | Slater | G01H 9/00 367/178 |
| 9,412,269 B2* | 8/2016 | Saptharishi | G06T 7/20 |
| 10,298,813 B2* | 5/2019 | Sprigg | G06T 5/003 |
| 10,403,107 B2* | 9/2019 | Hill | G06V 20/52 |
| 10,728,436 B2* | 7/2020 | Piekniewski | G01C 3/08 |
| 11,209,517 B2* | 12/2021 | Yachida | G01S 15/86 |
| 2007/0166049 A1 | 7/2007 | Pearson et al. | |
| 2008/0084539 A1* | 4/2008 | Daniel | G06V 40/19 351/210 |
| 2018/0012461 A1 | 1/2018 | Hill et al. | |
| 2018/0012561 A1 | 1/2018 | Yoon et al. | |
| 2018/0273208 A1 | 9/2018 | Ismail | |
| 2019/0180077 A1 | 6/2019 | Zhou et al. | |
| 2022/0299642 A1 | 9/2022 | Bray et al. | |

FOREIGN PATENT DOCUMENTS

| | | |
|---|---|---|
| WO | 2013108253 A1 | 7/2013 |
| WO | 2017207716 A1 | 12/2017 |
| WO | 2021038191 A1 | 3/2021 |
| WO | 2021038199 A1 | 3/2021 |

OTHER PUBLICATIONS

International Preliminary Report on Patentability received for PCT/GB2020/051996, mail date: Mar. 10, 2022. 9 pages.

International Search Report and Written Opinion received for PCT Application No. PCT/GB2020/051996. Mail date: Nov. 12, 2020. 14 pages.

GB Search Report under Section 17(5) received for GB Application No. 1912327.2, dated Feb. 12, 2020. 3 pages.

Extended European Search Report received for EP Application No. 19275106.3 dated Apr. 15, 2020. 8 pages.

International Search Report and Written Opinion received for PCT Application No. PCT/GB2020/051931. Mail date: Nov. 16, 2020. 16 pages.

GB Search Report under Section 17(5) received for GB Application No. 1912326.4, dated Feb. 12, 2020. 5 pages.

Extended European Search Report received for EP Application No. 19205694.3, dated Mar. 4, 2020. 8 pages.

* cited by examiner

DETECTION OF MODULATING ELEMENTS

TECHNICAL FIELD

The present application relates to methods and apparatus of optical detection of an object. In particular, it relates to optical detection of a modulating element of an object.

BACKGROUND

The low cost and availability of unmanned aerial vehicles (UAVs) or drones makes them a useful tool for criminals and military adversaries. They may be used as surveillance assets or as a means of transporting a payload. As an example, criminals are known to use drones to smuggle illegal drugs or contraband mobile phones over prison walls. Drones may also be used to carry explosives, chemical weapons, or other weapon payloads, or simply to disrupt activities in crowded stadiums, airports, flight paths, military bases, and other restricted areas. For example, in a recent incident, a drone was used maliciously to disrupt an airport by flying near the airport runway. This led to the grounding of planes at the airport while it was thought the drone remained in the vicinity.

Drone detection has proven difficult, particularly because they have a small visual cross-section, and may not provide a significant thermal, acoustic, or RF signature to enable their detection, particularly when the field of regard of the sensor attempting to detect the drone may be considerable. For example, the region in and around an airport, including the flight path of the airplanes, may extend to many tens of square kilometres in area and a significant distance vertically.

Vision based systems can recognise drones from their shape if the drone is sufficiently large on the image. This requires a high acuity sensor, often combined with a long focal length lens, to detect the drone at any substantial range. The ability to cover wide areas of sky from such an optical system is limited.

Radar, similarly, suffers from the same problem in that it requires a sufficient response from an interrogated drone for it to be detected. The composition of many drones is predominantly plastic with little in the way of metallic content, this ensures they are lightweight for power efficiency, but provides for a poor radar signature.

RF detection of the transmitter may be used, for example where the drone is being controlled using RF means. The range of RF may be greater than for visual means, and will not be obscured by cloud or poor weather conditions. Detecting the RF signature is difficult in RF cluttered environments and it is even more difficult to locate the object with any accuracy. Obtaining direction requires a large antenna baseline and significant processing, making the equipment cumbersome and expensive.

Acoustic detection means are unsuitable at any substantial range, and sensitivity falls rapidly in the presence of other acoustic clutter such as road traffic noise. Spatial resolution is also limited by the sound wavelength.

SUMMARY

In an aspect, there is provided a method for detecting a modulating element of an object, comprising obtaining signal values from one or more optical detectors and determining if there is a time dependent variation in the obtained signal values at the one or more optical detectors, and detecting a modulating element based on the determination.

Thus, a simple but effective way of detecting modulating elements of an object is provided that uses passive optical detection. Detection of a modulating signal, rather than a detailed categorisation of an object from its shape, e.g. with complex image processing techniques, allow for a simple categorisation that helps to classify an object e.g. a drone rather than a seagull. This can potentially be achieved at sub-pixel resolution, for example, thereby providing sensitivity at a level not achievable using other methods.

For example, an object may be a rotor propelled airborne vehicle, or drone, where the rotor blades constitute a modulating element of the object. In particular, the vehicle may be an unmanned aerial vehicle (UAV) i.e. a drone.

The one or more optical detectors may be non-imaging optical detectors. The one or more non-imaging optical detectors may operate in a continuous detection mode. Thus, providing continuous feedback on an image scene without problems associated with discrete image capture. Further, continuous detection can potentially detect modulating frequencies over a much wider bandwidth than an imaging sensor, which will be limited by effects including pixel stare time and the frame rate, for example.

The determination from signals obtained from the one or more optical detectors may be used to track the position of the modulating element. A control signal based on the tracking of the modulating element may be used for controlling or guiding an apparatus towards the detected element. Accordingly, effective tracking of an object of interest having a modulating element may be achieved without detailed characterisation or identification of the object. The one or more non-imaging optical detectors may comprise four non-imaging optical detectors arranged as a quadrant detector. Further, the one or more non-imaging optical detectors may comprise a position sensing device. Either provide a simple and effective way of providing position information from a detected modulation signal that allows for the position of the modulating element of an object to be determined.

In an embodiment, the one or more optical detectors are pixels of an imaging sensor. The determination may be made by comparing pixel values in successive image frames. Detecting the modulating element comprises determining a location of the modulating element within the frame based on the determination at respective pixels of the image sensor. Accordingly, when applied in the context of an image sensor, accurate information about where modulating elements are located across a scene may be provided.

The signal values may be processed to deemphasise or remove an unmodulated background signal component. The processing may comprise filtering the obtained signal value. The filtering may be applied using at least one of a band-pass and a high-pass filter. Thus, the effects of a non-modulating background intensity (e.g. contrast) may be eliminated to better measure the true modulation. Filtering further, may improve signal to noise ratio in the system to improve detectability e.g. by using a band-pass filter centred on the modulation frequency.

The processing may comprise mixing a signal generated at a local oscillator with the obtained signal values. An advantage is that the characteristic frequency is moved to a lower value such that it can be detected with low bandwidth electronics which are typically cheaper and less complex. This can also be effective in managing noise added after the mixer.

The detection may include comparing the determined time-varying signal with a threshold. For example, the time-varying signal may be integrated and the resulting output subject to a threshold to exclude values that are too small or too large to be valid.

The signal values may be obtained from a plurality of optical detectors, and the location of the modulating element triangulated based on the detection of the modulating element at two or more optical detectors. Thus, the location of the modulating element may be accurately determined.

The modulating element may be one or more of: a rotor of a UAV or other vehicle, an emission from a vehicle exhaust, and a portion of a human face. The invention is not limited to these examples, however, and may be applicable to other modulating things such as the steady rotation of a wheel or breathing.

In another aspect of the invention, there is provided apparatus for detecting a modulating element of an object, comprising means for obtaining signal values from one or more optical detectors, means for determining if there is a time dependent variation in the obtained signal values at the one or more optical detectors, and means for detecting a modulating element based on the determination.

The one or more optical detectors may be non-imaging optical detectors.

The one or more non-imaging optical detectors may be arranged to operate in a continuous detection mode. Imaging optical detectors may also be made to act in a continuous detection mode if the readout circuitry was configured to include analogue modulation detection on a pixel-by-pixel basis e.g. so only pixels meeting a threshold fired (are read out). This would allow an effectively continuous detection.

The apparatus may further comprise means for using the determination from signals obtained from the one or more optical detectors to track the position of the modulating element.

The apparatus may further comprise means for providing a control signal based on the tracking of the modulating element for guiding an apparatus towards the detected element.

The one or more non-imaging optical detectors may comprise four non-imaging optical detectors arranged as a quadrant detector. The one or more non-imaging optical detectors may comprise a position sensing device.

The one or more optical detectors may be pixels of an imaging sensor. The determination may be made by comparing pixel values in successive image frames. Detecting the modulating element comprises means for determining a location of the modulating element within the frame based on the determination at respective pixels of the image sensor.

The apparatus may further comprise means for processing the signal values to deemphasise or remove an unmodulated background signal component. The means for processing may comprise a signal for filtering the obtained signal value. The filter may include at least one of a band-pass and a high-pass filter.

The means for processing may comprise a heterodyne mixer and a local oscillator, wherein the heterodyne mixer is configured to mix a signal from the local oscillator with obtained signal values.

The detection includes comparing the determined time-varying signal with a threshold. The modulating element may be: one or more of: a rotor of a UAV or other vehicle, emissions from a vehicle exhaust, and a portion of a human face.

In a further aspect according to the present invention there is provided, a detector comprising: one or more optical detectors, and apparatus according to any of the above described apparatus aspects or embodiments. The one or more optical detectors may be non-imaging optical detectors. For example, a quadrant detector or a position sensing (sensitive) device. The one or more optical detectors may be pixels of an image sensor.

In another aspect according to the invention, there is provided a computer program which upon execution causes any of the methods outlined above to be performed. The computer program may be embodied on a computer-readable or machine-readable carrier medium, the carrier medium may be transitory or non-transitory. For example, the carrier may be a signal modulated to carry data indicative of computer program code. Alternatively, the carrier may be a storage medium such as a computer readable disk or memory stick. In an example, a device is provided having one or more processors and a memory, wherein the memory contains processor executable code which upon execution by the one or more processors causes any of the example methods above to be performed. The device may comprise electronic circuitry, for example, an ASIC or a configurable logic circuit (e.g. an FPGA) which embodies the one or more processors and a memory.

BRIEF DESCRIPTION OF THE DRAWINGS

Embodiments will now be described, by way of example only, with reference to the accompanying drawings, in which.

DESCRIPTION

Example embodiments are described below in sufficient detail to enable those of ordinary skill in the art to embody and implement the systems and processes herein described. It is important to understand that embodiments can be provided in many alternate forms and should not be construed as limited to the examples set forth herein.

Accordingly, while embodiments can be modified in various ways and take on various alternative forms, specific embodiments thereof are shown in the drawings and described in detail below as examples. There is no intent to limit to the particular forms disclosed. On the contrary, all modifications, equivalents, and alternatives falling within the scope of the appended claims should be included. Elements of the example embodiments are consistently denoted by the same reference numerals throughout the drawings and detailed description where appropriate.

The terminology used herein to describe embodiments is not intended to limit the scope. The articles "a," "an," and "the" are singular in that they have a single referent, however the use of the singular form in the present document should not preclude the presence of more than one referent. In other words, elements referred to in the singular can number one or more, unless the context clearly indicates otherwise. It will be further understood that the terms "comprises," "comprising," "includes," and/or "including," when used herein, specify the presence of stated features, items, steps, operations, elements, and/or components, but do not preclude the presence or addition of one or more other features, items, steps, operations, elements, components, and/or groups thereof.

Unless otherwise defined, all terms (including technical and scientific terms) used herein are to be interpreted as is customary in the art. It will be further understood that terms in common usage should also be interpreted as is customary in the relevant art and not in an idealized or overly formal sense unless expressly so defined herein.

The rotation of a propeller that has a different contrast, colour, or temperature to the object behind it, will result in the pixels that capture the propeller exhibiting a time dependent variation in intensity (or colour or temperature). This modulation will be a compound effect of the rotational speed of the propeller, the frame update rate, the pixel stare time, and in some cases occlusion e.g. by structural elements of a UAV.

A readout circuit can be designed to detect, using electronic or computational means, this regular modulation resulting from the motion of the propeller. This will provide a mechanism from which the object will be detected.

Figure 1:
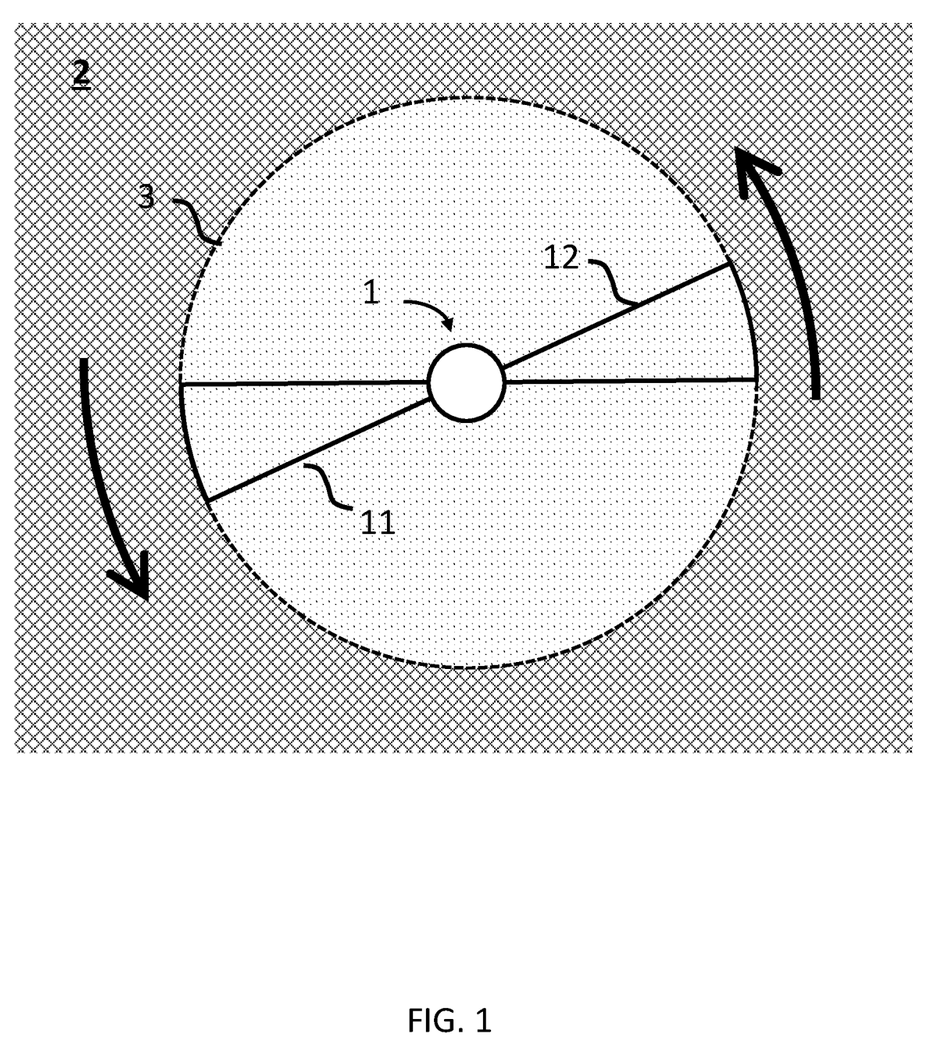
FIG. 1 shows a schematic diagram of a propeller of a vehicle.

FIG. 1 depicts a rotating propeller 1 against a lower intensity background 2. The propeller 1 contains two rotor blades 11, 12 which is typical of a lightweight UAV. However, other UAVs or vehicles may have a greater number of blades. The blades 11,12 themselves occupy a segment of a circular rotational region 3 of the propeller. When imaging this propeller with a high-resolution imaging device (e.g. one or more optical detectors), a pixel may only occupy a small region of the propeller rotation circle. If the distance to the propeller is large, however, then the propeller may be sub-pixel in size, in which case some form of occlusion will be required for modulation to be detectable, such that the cross-sectional area being imaged changes at a characteristic frequency.

Figure 2A:
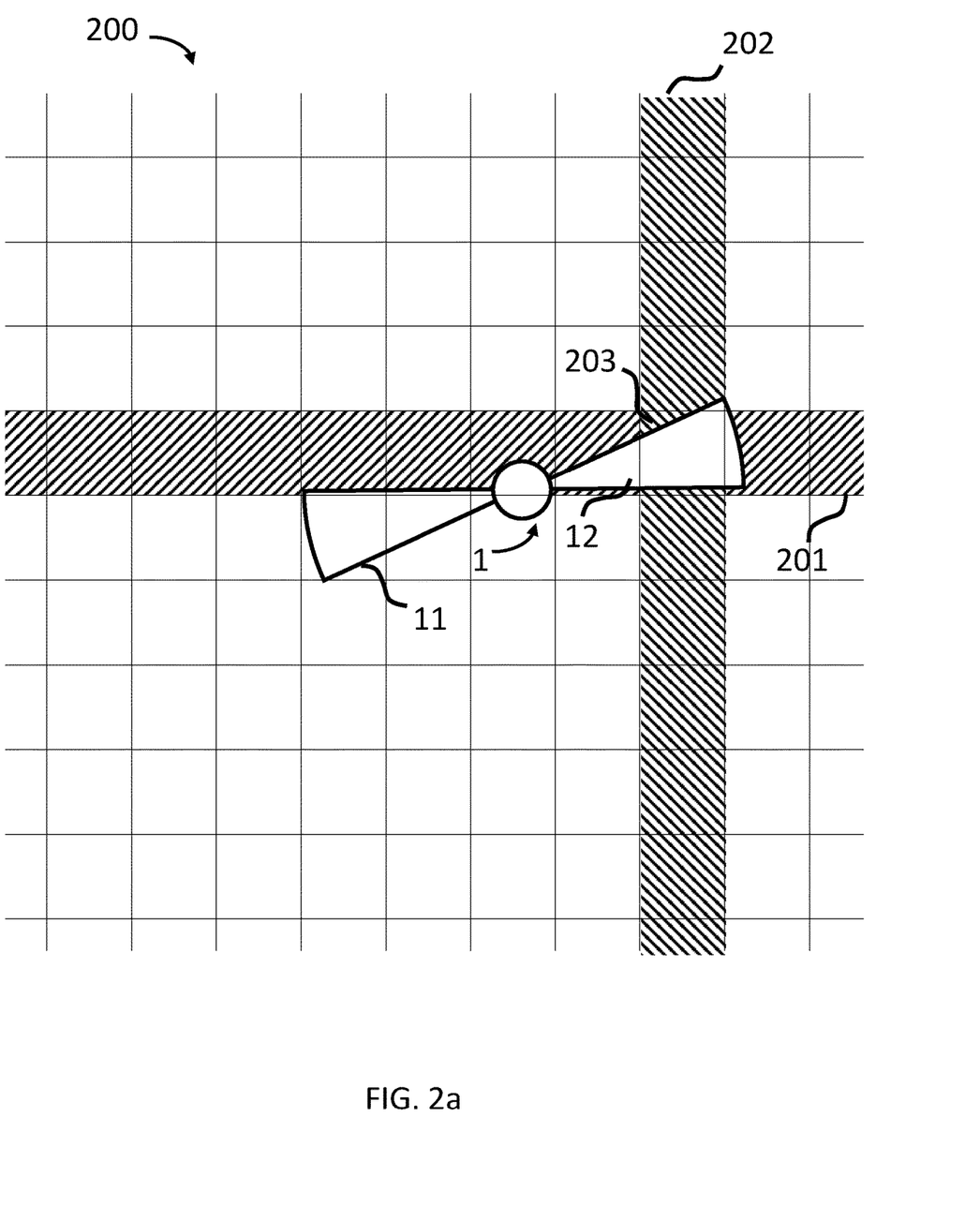
FIGS. 2a and 2b shows schematic diagrams illustrating a pixel grid upon which a rotating propeller is imaged according to an embodiment.
Figure 2B:
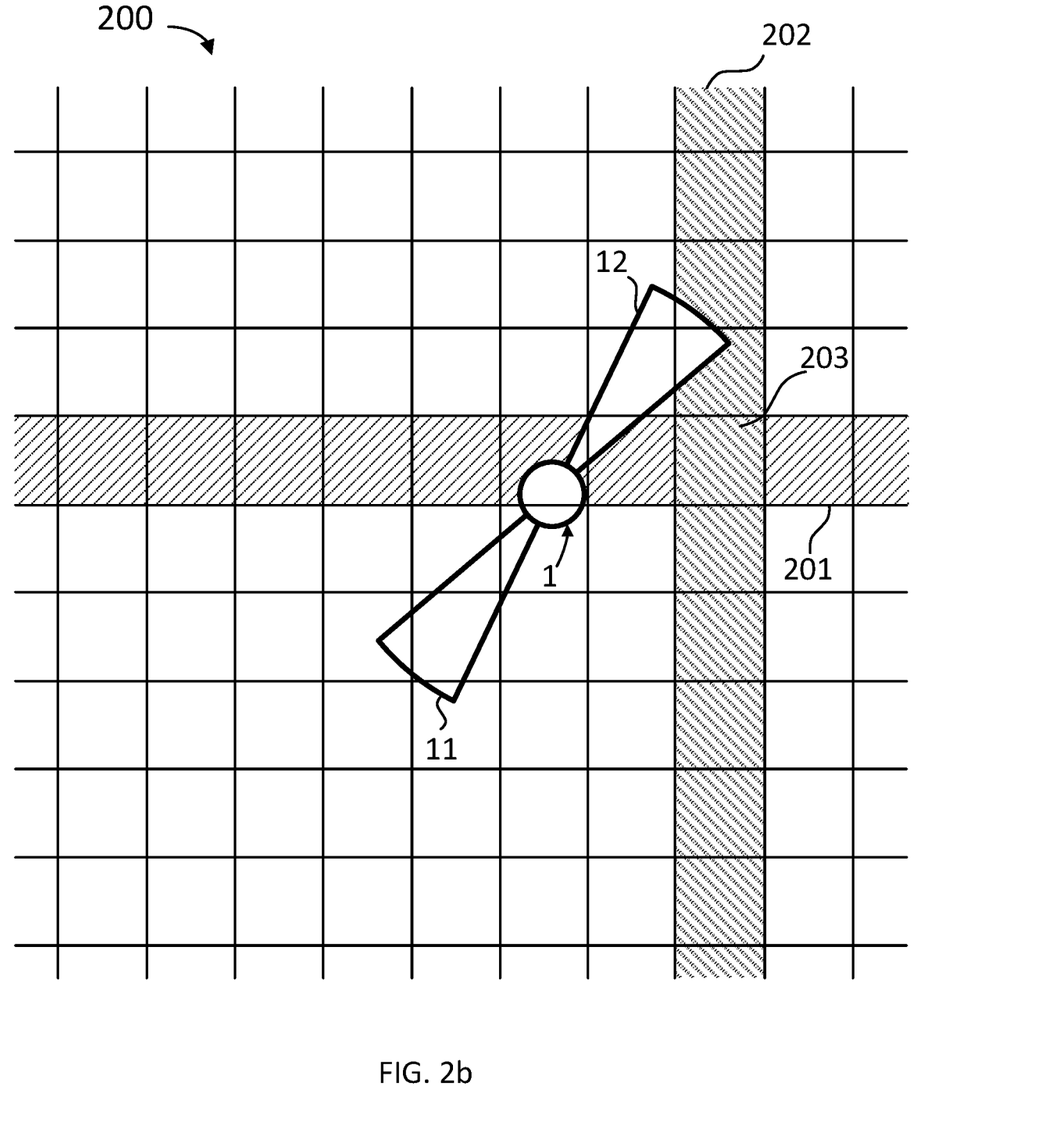

FIGS. 2a and 2b show an example of such a high-resolution imaging device having an image sensor that is formed of a grid of pixels 200 (optical detectors). A shaded row 201 and column 202 of pixels intersect at a single pixel 203 that will exhibit a high or low intensity state depending on the contrast, or intensity, of the propeller blade 11,12 relative to its background. For example, in FIG. 2a the pixel of interest 203 will exhibit a high value signal at the pixel due to the pixel being occupied by the blade 12. At a subsequent point in time the propeller will have rotated such that the blade 12 no longer covers the pixel 203 and thus, the pixel will output a low signal value e.g. having an intensity corresponding to the background contrast level. In other words, with propeller rotation the value of the pixel will undergo a detectable modulation as shown in FIG. 3.

Figure 3:
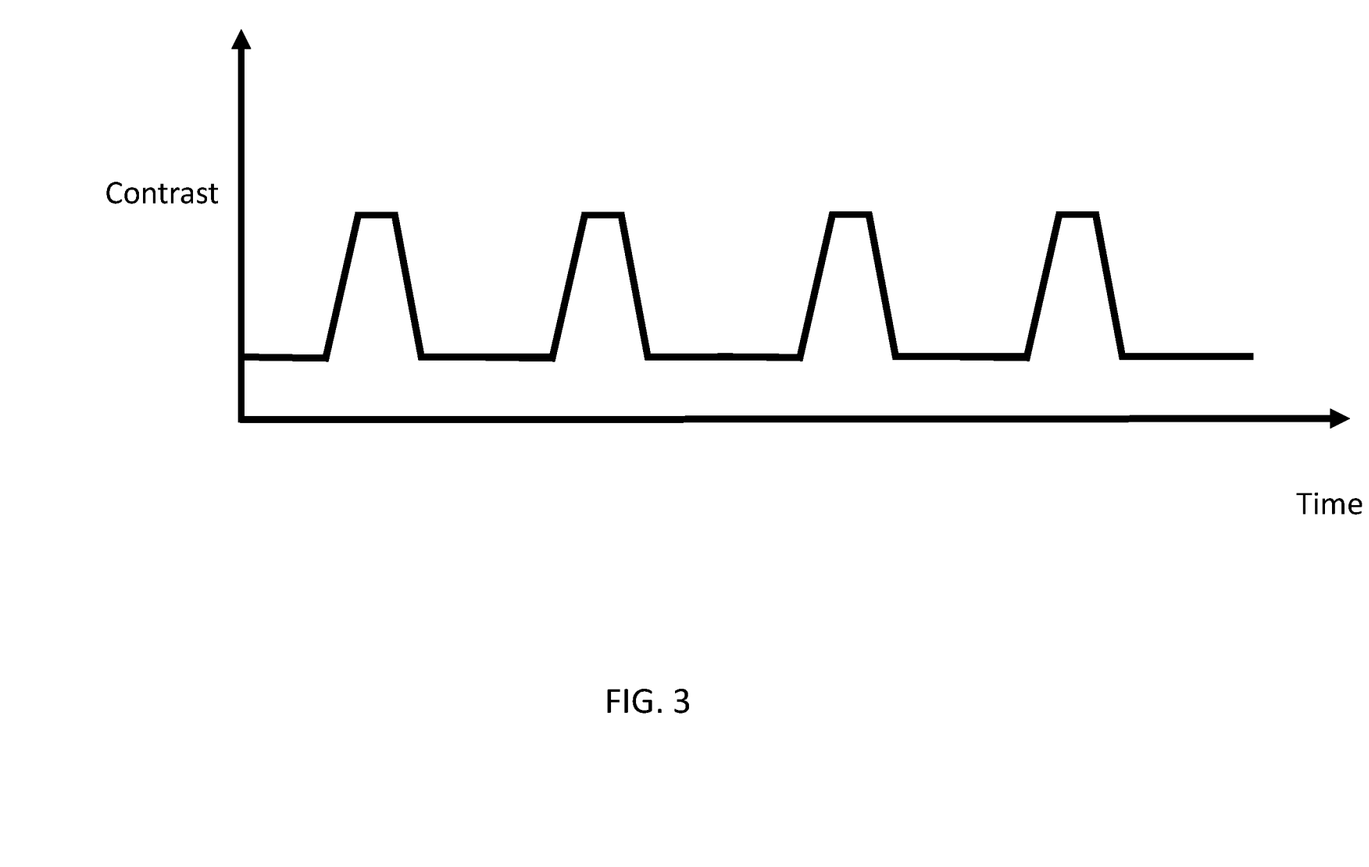
FIG. 3 is a plot of contrast against time for a signal received at an optical detector from modulating element of an object according to an embodiment.

FIG. 3 shows a plot with contrast on the ordinate axis and time measured along the abscissa axis. The modulation can be seen in the form of the peaks in contrast (which will translate to signal value received at the pixels) forming a pulse train in which the pulses are separated by gaps (mark-space ratio) along the abscissa which represent the time period for the propeller 11 to rotate such that the following blade 11, 12 reaches the pixel 203 and causes the contrast (signal intensity) to increase. The mark-space ratio and repetition frequency of the pulse train will vary in proportion to the factors including propeller blade occupancy, rotation speed, and sensor (pixel) stare time.

Figure 4A:
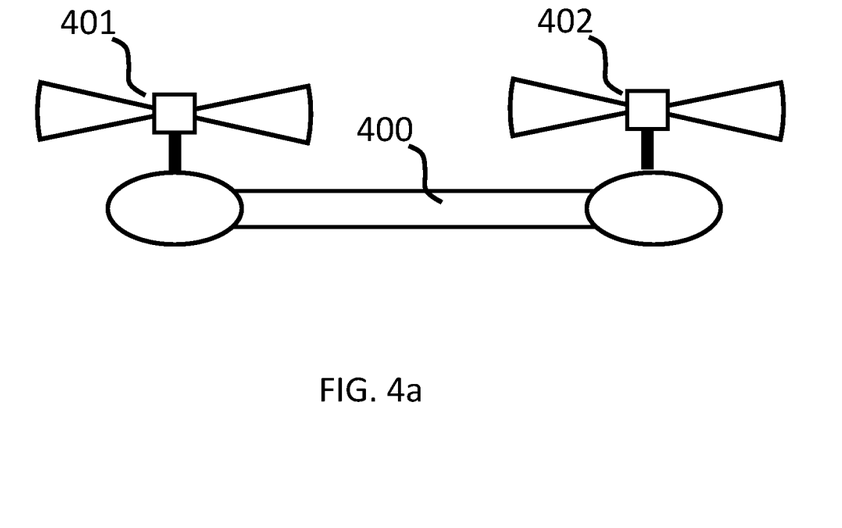
FIGS. 4a and 4b are schematic diagrams of side-views of an unmanned aerial vehicle showing two visible propellers.
Figure 4B:
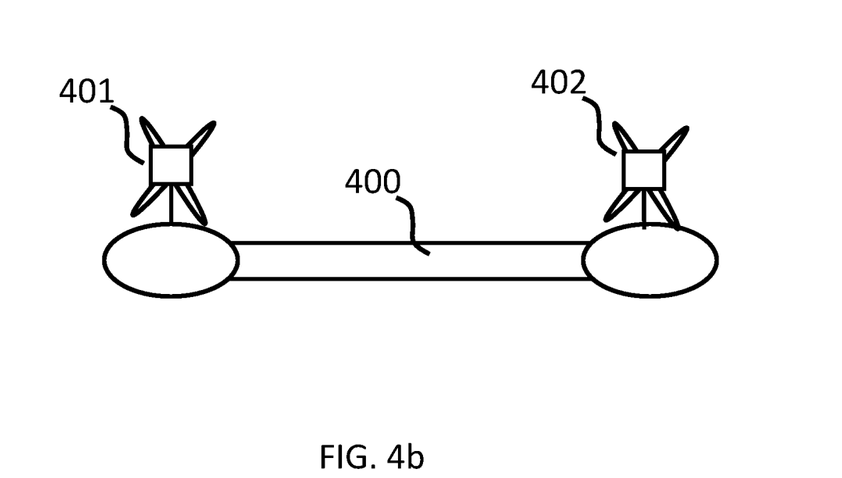

FIG. 1 and FIG. 2 depict a bottom up (or top down) view of a propeller 1 with two rotor blades 11, 12. The principle of detection of a modulating element similarly works with a side on, or also an oblique view of the air platform of the UAV. FIGS. 4a and 4b depict a quadrotor UAV 400 with two visible rotating propellers 401, 402, each having two blades. As the blades rotate, the side-on visibility of the rotor blade also modulates as the blades (in this example a dual bladed rotor element) rotate from the blade being parallel to imaging plane (FIG. 4a) i.e. the blade is side on, to being perpendicular to the image plane (FIG. 4b) i.e. the blade is end on.

Dual bladed rotors (propellers) such as that depicted in FIGS. 1 and 4a, 4b are typical on small UAVs, but the principle of operation of this method also works for rotors with three or more blades.

Other non-modulating image elements will not vary in such a repetitive manner, this makes the detection and location of the modulating object within an image scene easy to detect, even when it occupies a small proportion of the image. The modulated signal should be detectable even when the pixel (optical detector) is large compared to the size of the target object on the image. A single pixel (optical detector) that occupies a large proportion of the propeller circle region will still contain a modulated component.

In particular the case where the pixel size fully encompasses the bladed region, and the optical detection/imaging is performed when observing the object (e.g. UAV) from above or below the ability to continue to detect the modulating element will depend on the presence of occluding elements (i.e. struts or other structural elements of the UAV), or on the angle of the blades relative to the field of view of the imager. In the case of FIGS. 4a and 4b, a modulating signal will still be present due to the change in contrast at the single detector site as the blade rotates from side on to end on with respect to the optical detector.

Figure 5:
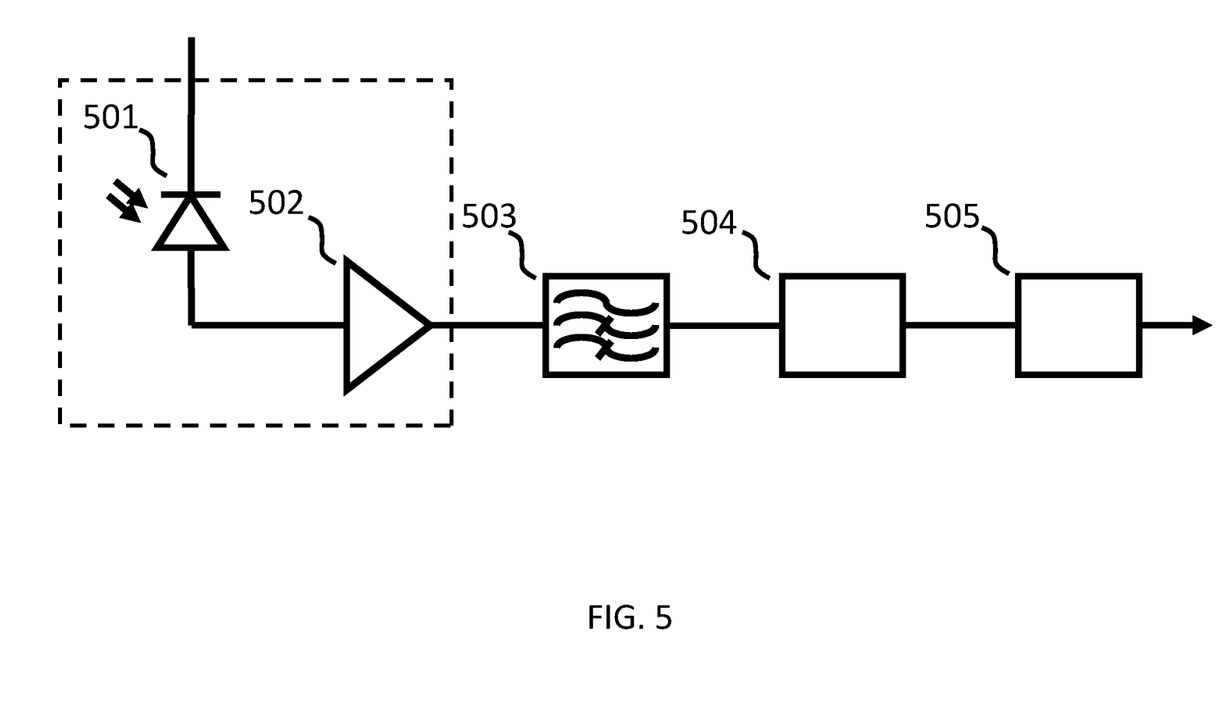
FIG. 5 is a block diagram showing a readout circuit according to an embodiment.

FIG. 5 shows a circuit for readout of a signal value from an optical detector e.g. a pixel. The combination of the photodetector 501 and amplifier 502 may exemplify a single pixel (optical detector) of an imager focal plane array. This is followed by a filter 503, e.g. a high pass filter setting a filter pass threshold to a level that will remove the unmodulated background signal of the image. The output of this filter is then integrated by an integrator 504 and a threshold detection circuit 505 will determine whether this modulated signal is a true detection. The threshold detection circuit being configured to only return signals that cross a threshold to be detected, thus avoiding false detections from noise or other signal artefacts.

If the pixel modulation frequency is determinable, the filter 503 may be a band-pass filter. This would have the advantage of reducing in-band noise. Further, the filter may be configured to only let through modulating signals having a frequency or frequency range that is indicative of the type of object being detected. In other words, the filtering could be tuned to the frequency of a target category of object (i.e. based on a known rotation speed or range of speeds of a UAV). In another embodiment, the filter could be configured to track the modulating frequency one it has been detected or to adaptively narrow its bandwidth to improve the signal to noise ratio.

Figure 6:
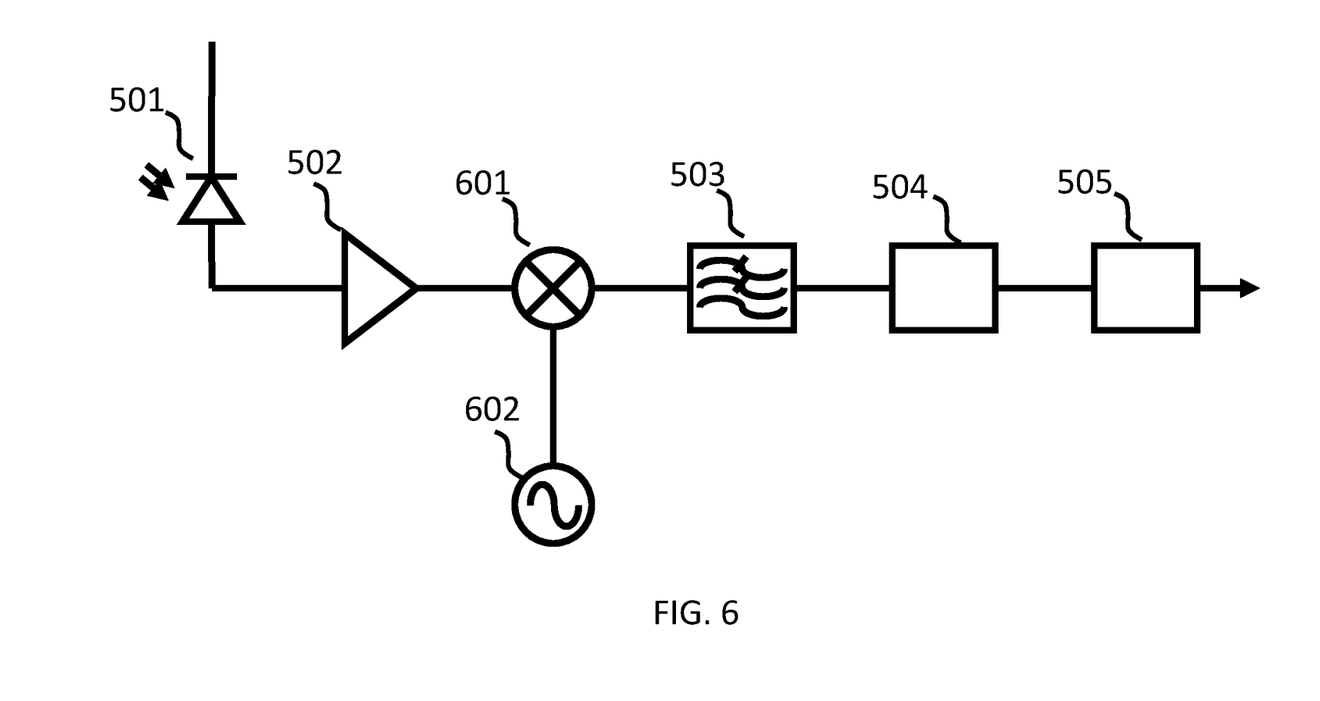
FIG. 6 is a block diagram showing a readout circuit according to an embodiment.

In another embodiment, shown in FIG. 6, the pixel photodetector 501, 502 may be connected to a heterodyne mixing circuit 601, such that the received signal is mixed with a local oscillator signal provided by a local oscillator 602. The output from the mixer 601 may then be filtered prior to threshold detection. This circuit arrangement has the advantage of that the characteristic frequency of the modulation is moved to a lower value such that it can be detected with low bandwidth electronics which are typically cheaper and less complex). The circuit of FIG. 6 shows both mixer and oscillator 601, 602 and a filter 503, however, in some embodiments, the filter may be omitted and only the mixer and oscillator 601, 602 used.

While the camera is staring, electrons may be collected in a capacitor associated with the pixel photodetector 501, 502 (not shown). During read out electronic switches (not shown) may be configured to discharge the capacitor to an analogue to digital converter (not shown) and isolate it from the pixel before resetting. This circuitry is typically part of a focal plane array of a camera and thus is difficult/expensive to change. However, the filter 503, integrator 504 and threshold circuitry 505 or the mixer 601 and local oscillator 602, could easily be implemented using digital signal processing techniques.

In an imaging sensor, the filtering in FIGS. 5 and 6 may happen after the frame is read out via the read-out integrated circuit 501, 502. In other words, the filtering is applied to each pixel upon readout of the whole image frame from the sensors grid of pixels. In an embodiment, the filtering capability is included on the analogue or digital electronics of each pixel i.e. on a pixel-by-pixel basis. Therefore, only modulating pixels are 'triggered' (e.g. by the threshold detection circuit 505) and these 'triggered' pixels can be read out without reading the non-'triggered' pixels i.e. rather than reading out the whole frame. This would be advantageous because it would allow a higher data rate and for accessing high modulation rates (frequencies) without aliasing. In an embodiment, the implementation would use a dedicated ASIC readout integrated circuits (ROICs). The additional expense of the dedicated circuitry would be justified in high value or critical applications, however.

The above circuit may also be implemented digitally within a digital signal processor, or other suitable processing means. For example, it may be embodied within the digital signal processing unit of an optical detector (e.g. an imaging sensor). It may be encoded within the firmware of an imaging readout sensor, or implemented as an analogue detection component of a focal plane array readout circuit such as those of FIGS. 5 and 6.

In an embodiment, the invention may be implemented using a non-imaging optical detector. An optical detector configuration that could use either a single, bi, or quadrant detector arrangement rather than an imaging sensor. These single-pixel variants may operate in a continuous detection mode and would continue to observe a modulation signal relative to the rotor blade motion.

One example of which may be a single pixel detector. Non-imaging optical detectors typically have a mode in which a signal can be continuously obtained which is advantageous as it is not necessary to take into account frame rates and artefacts that may result from using an imaging optical detector such as a camera image sensor which obtains frames at discrete time intervals.

In a further embodiment a quadrant detector may be used. A quadrant detector may be able to locate as well as detect the modulating signal. The principle of a quadrant detector is widely used as part of a feedback loop in tracking systems. In this application, the quadrants of the detector may operate continuously (as opposed to the discrete time mode of an imaging pixel). The signal received on each detector may operate with the receiver circuit shown in FIG. 5 for example.

The propeller would be defocussed at the imaging plane of the quadrant sensor and part of it may need to be occluded in order to observe modulation, particularly if the propeller is being viewed from directly above or below. The defocussing allows the modulating signal needs to be present in all four quadrants simultaneously for accurate detection of location.

Figure 7:
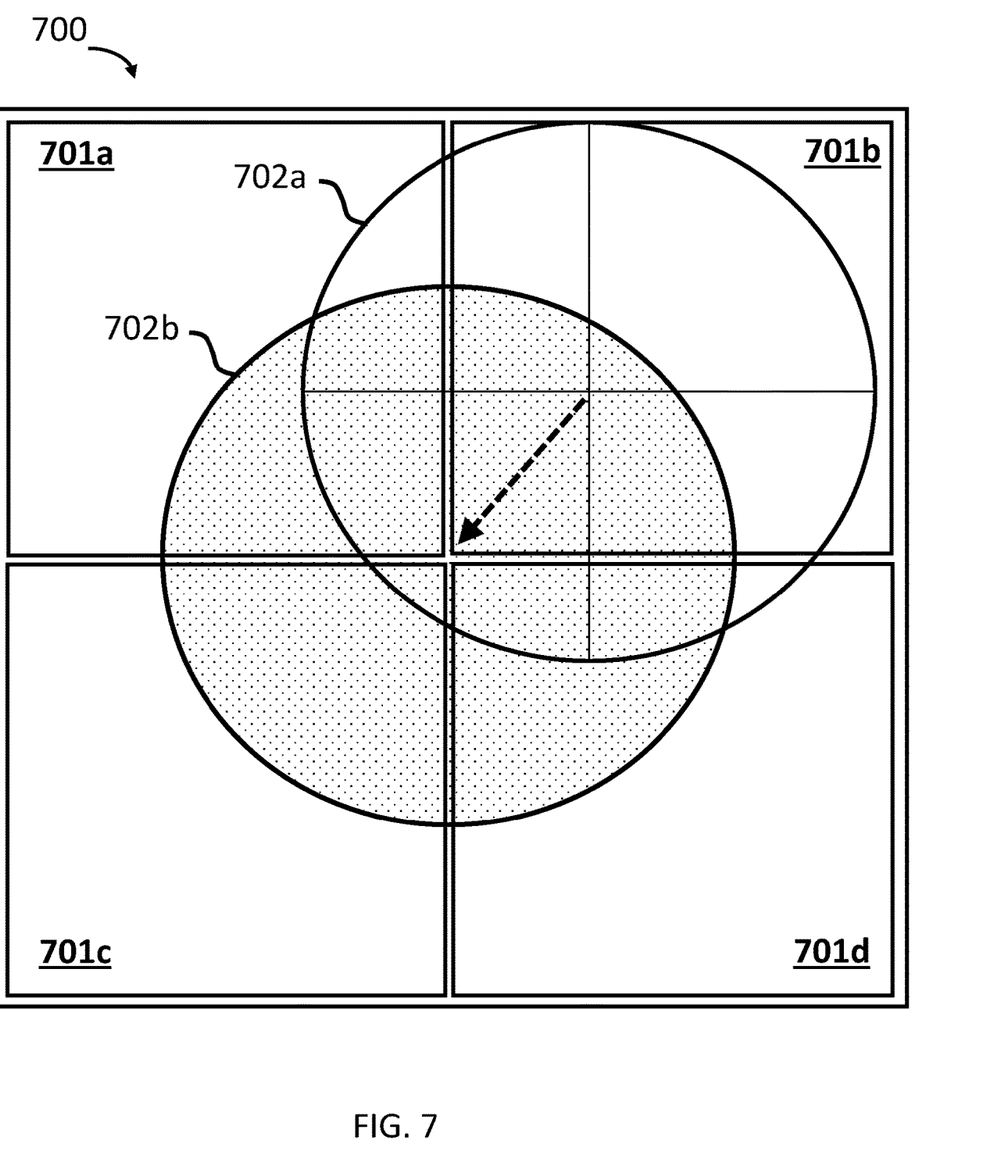
FIG. 7 shows schematic of a quadrant detector according to an embodiment.

FIG. 7 shows a quadrant detector 700 according to an embodiment. The quadrant detector has four non-imaging optical detectors (usually photodiodes) 701a, 701b, 701c, 701d arranged about four quadrants of a square. A quadrant detection mode of the quadrant detector 700 enables the detector to locate and track the UAV. For example, a source (target) in the scene may be defocussed and is imaged onto the four quadrants together. The relative values in each of the four quadrants 701a, 701b, 701c, 701d provide the position. That is to say, where the defocused image of the modulating element is not located centrally about the plane of the quadrant detector 700 the respective amplitudes of the detected modulation in signal level in the respective areas 701a, 701b, 701c, 701d may be different and these differences will result in different detected signal values that can be used to determine the position of the modulating element to provide the a relative displacement to the origin of the quadrant detector 700.

In an embodiment, the quadrant detector may be attached to a control module or other circuitry for controlling or guiding the movements of an apparatus towards (or away) from the modulating element. For example, the quadrant detector may provide signals that are used to control a mechanical steering arrangement to enable other sensors or actuators to be directed towards the modulating object. In a military environment this could be used as part of a weapon or guidance system to track and engage a target object having a modulating element. For example, to track and engage a target hostile UAV or other object.

Considering the example of FIG. 7, the optically defocused image circle of a propeller 1 is at a first position 702a. Due to the image blurring the depth of signal modulation in each quadrant should be proportional to the amount of the blurred propeller each quadrant contains. At this position the signal at the upper-right detector 701b will be highest due to the defocussed image 702a occupying a larger portion of the upper right quadrant 701b than any other quadrant. The signal at the lower-left quadrant 701c will be lowest due to having the smallest portion of the blurred image circle 702a covering that area. The signals at the upper-left 701a and lower-right 701d will be somewhere between these two extremes as the image circle 702a modestly encroaches into these quadrants. These relative signal levels will allow a displacement to be determined from the signal values e.g. by a control module, which may send the signal to direct a steering arrangement to guide the apparatus with the quadrant detector to the target propeller 1 according to the displacement. After the steering mechanism is thus controlled, the defocused image circle of the propeller 1 may be located at the centre of the quadrant detector at position 702b, for example.

Although a quadrant detector is shown in the example of FIG. 7, in other embodiments, the number of optical detectors may be different. For example, a bi-cell detector may be used. Alternatively, the number of detectors may be greater than four, for example, where the optical detectors are arranged as segments of a circular sensor region about a point of origin (not shown).

In another embodiment, a type of non-imaging optical detector (sensor) called a position sensing device (also called a position sensitive device or position sensitive detector) may be used. A position sensing device is an optical position sensor that includes a semiconductor diode with North and South contacts on the top surface and East and West contacts on the bottom surface. Illumination of a portion of the diode surface may cause a change in local resistance and thus changes in electrical current flowing through the pairs of contacts. The relative electrical currents through the pairs of contacts relate to the position of illumination through the change in resistances. As will be appreciated, position sensing devices may operate isotropically and provide a continuous signal output or may be configured as a discrete sensor.

In another embodiment, the position may be determined (and thus the object tracked) using the outputs of two or more detectors together with a suitable baseline (i.e. point of reference) to triangulate the location of the target object according to method of triangulation as known to those skilled in the art.

The modulating element may generate a modulating signal at the optical detector as a result of a change in contrast, intensity, colour, or temperature for example. In the latter case the sensor would be responsive to the thermal band.

The methods and apparatus described may be advantageous in other applications than detection of UAVs. For example, the modulating element may be the thermal emissions of a vehicle exhaust that are modulated by the engine revolutions, enabling the detection of vehicles from a modulating exhaust signature. In a further potential application, the modulating element may be the colour of a human face resulting from the heartbeat signature. Detection of the modulating element may enable face detection in cluttered scenes.

In the above description we refer to pixels when describing certain embodiments with imaging and non-imaging optical detectors but this is not intended to be limiting. Any means of optical detection may be used e.g. a photo sensor or diode, which is capable of detecting light intensity levels and producing a measurable signal output in proportion to the amount of light detected.

Examples in the present disclosure can be provided as methods, systems or machine readable instructions, such as any combination of software, hardware, firmware or the like. Such machine readable instructions may be included on a computer readable storage medium (including but not limited to disc storage, CD-ROM, optical storage, etc.) having computer readable program codes therein or thereon.

The methods described herein may be realised by machine readable instructions. The machine readable instructions may, for example, be executed by a general purpose computer, a special purpose computer, an embedded processor or processors of other programmable data processing devices to realize the functions described in the description and diagrams. In particular, a processor or processing apparatus may execute the machine readable instructions. Thus modules of apparatus (for example, an imaging device such as an optical detector or a camera with an image sensor) may be implemented by a processor executing machine readable instructions stored in a memory, or a processor operating in accordance with instructions embedded in logic circuitry. The term 'processor' is to be interpreted broadly to include a CPU, processing unit, ASIC, logic unit, or programmable gate set etc. The methods and modules may all be performed by a single processor or divided amongst several processors. Such machine readable instructions may also be loaded onto a computer or other programmable data processing devices, so that the computer or other programmable data processing devices perform a series of operations to produce computer-implemented processing, thus the instructions executed on the computer or other programmable devices provide an operation for realizing functions specified herein.

Such machine readable instructions may also be stored in a computer readable storage that can guide the computer or other programmable data processing devices to operate in a specific mode. For example, the instructions may be provided on a non-transitory computer readable storage medium encoded with instructions, executable by a processor.

Further, the teachings herein may be implemented in the form of a computer software product, the computer software product being stored in a storage medium and comprising a plurality of instructions for making a computer device implement the methods recited in the examples of the present disclosure.

The present inventions can be embodied in other specific apparatus and/or methods. The described embodiments are to be considered in all respects as illustrative and not restrictive. In particular, the scope of the invention is indicated by the appended claims rather than by the description and figures herein. All changes that come within the meaning and range of equivalency of the claims are to be embraced within their scope.

The invention claimed is:

1. A method for detecting a modulating element of an object, the method comprising:
   obtaining signal values from one or more optical detectors, wherein the one or more optical detectors comprise four non-imaging optical detectors arranged as a quadrant detector;
   determining if there is a time dependent variation in the obtained signal values at the one or more optical detectors; and
   detecting a modulating element based on the determination.

2. The method according to claim 1, wherein the one or more non-imaging optical detectors operate in a continuous detection mode.

3. The method according to claim 2, comprising using the determination to track the position of the modulating element.

4. The method according to claim 3, comprising providing a control signal based on the tracking of the modulating element for guiding an apparatus towards the detected element.

5. The method according to claim 1, wherein the one or more non-imaging optical detectors comprise a position sensing device.

6. The method according to claim 1, further comprising filtering the obtained signal values to deemphasize or remove an unmodulated background signal component.

7. The method according to claim 6, wherein said filtering uses one or both of a band-pass filter and a high-pass filter.

8. The method according to claim 1, wherein the processing comprises mixing a signal generated at a local oscillator with the obtained signal values.

9. The method according to claim 1, wherein said detection includes comparing the determined time-varying signal with a threshold.

10. The method according to claim 1, wherein signal values are obtained from a plurality of optical detectors, the method comprising triangulating the location of the modulating element based on the detection of the modulating element at two or more optical detectors.

11. The method according to claim 1, wherein the modulating element is one or more of: a rotor of a unmanned aerial vehicle (UAV) or other vehicle, an emission from a vehicle exhaust, and a portion of a human face.

12. Apparatus for detecting a modulating element of an object, comprising:
- means for obtaining signal values from one or more optical detectors;
- means for determining if there is a time dependent variation in the obtained signal values at the one or more optical detectors;
- means for detecting a modulating element based on the determination;
- means for using the determination to track the position of the modulating element; and
- means for providing a control signal based on the tracking of the modulating element for guiding an apparatus towards the detected element.

13. The apparatus according to claim 12, wherein:
- the one or more optical detectors include one or more non-imaging optical detectors, or one or more pixels of an image sensor;
- the means for obtaining signal values includes a readout circuit;
- the means for determining if there is a time dependent variation includes a processor; and/or
- the means for detecting a modulating element includes a processor.

14. The apparatus according to claim 12, further comprising:
- a filter for processing the signal values to deemphasize or remove an unmodulated background signal component, wherein the filter includes at least one of a band-pass filter or a high-pass filter.

15. The apparatus according to claim 12, wherein the one or more optical detectors comprise four non-imaging optical detectors arranged as a quadrant detector.

16. The apparatus according to claim 12, wherein the one or more optical detectors comprise one or more non-imaging optical detectors configured to operate in a continuous detection mode.

17. A computer program product including one or more non-transitory machine-readable mediums encoding instructions that when executed by one or more processors cause a process to be carried out for detecting a modulating element of an object, the process comprising:
- obtaining signal values from one or more optical detectors;
- determining if there is a time dependent variation in the obtained signal values at the one or more optical detectors;
- detecting a modulating element based on the determination;
- using the determination to track the position of the modulating element; and
- providing a control signal based on the tracking of the modulating element for guiding an apparatus towards the detected element.

18. The computer program product according to claim 17, wherein the process further comprises processing the signal values to deemphasize or remove an unmodulated background signal component.

19. The computer program product according to claim 17, wherein obtaining the signal values from the one or more optical detectors comprises obtaining the signal values from one or more non-imaging optical detectors operating in a continuous detection mode.

20. The computer program product according to claim 17, wherein obtaining the signal values from the one or more optical detectors comprises obtaining the signal values from four non-imaging optical detectors arranged as a quadrant detector.

* * * * *